US006643801B1

(12) United States Patent
Jammu et al.

(10) Patent No.: US 6,643,801 B1
(45) Date of Patent: Nov. 4, 2003

(54) METHOD AND SYSTEM FOR ESTIMATING TIME OF OCCURRENCE OF MACHINE-DISABLING FAILURES

(75) Inventors: Vinay Bhaskar Jammu, Niskayuna, NY (US); Richard Gerald Bliley, Erie, PA (US); William Roy Schneider, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/491,939

(22) Filed: Jan. 26, 2000

Related U.S. Application Data

(60) Provisional application No. 60/162,047, filed on Oct. 28, 1999.

(51) Int. Cl.[7] ................................................ G06F 11/00
(52) U.S. Cl. .............................. 714/37; 701/29; 701/30; 701/35
(58) Field of Search .............................. 714/26, 47, 37; 701/29, 30, 35; 702/184

(56) References Cited

U.S. PATENT DOCUMENTS

| 4,041,470 A | * | 8/1977 | Slane et al. ............. 246/169 R |
| 4,270,174 A | | 5/1981 | Karlin et al. |
| 4,463,418 A | | 7/1984 | O'Quin, II et al. |
| 4,517,468 A | | 5/1985 | Kemper et al. |
| 4,695,946 A | | 9/1987 | Andreasen et al. |
| 4,823,914 A | | 4/1989 | McKinney et al. |
| 4,970,725 A | | 11/1990 | McEnroe et al. |
| 4,977,390 A | | 12/1990 | Saylor et al. |
| 5,113,489 A | | 5/1992 | Cihiwsky et al. |
| 5,123,017 A | | 6/1992 | Simpkins et al. |
| 5,210,704 A | | 5/1993 | Husseiny |
| 5,253,184 A | * | 10/1993 | Kleinschnitz ............... 702/184 |
| 5,274,572 A | | 12/1993 | O'Neill et al. |
| 5,282,127 A | | 1/1994 | Mii |
| 5,321,837 A | | 6/1994 | Daniel et al. |
| 5,329,465 A | | 7/1994 | Arcella et al. |
| 5,400,018 A | | 3/1995 | Scholl et al. |
| 5,406,502 A | | 4/1995 | Haramaty et al. |
| 5,445,347 A | | 8/1995 | Ng |
| 5,463,768 A | | 10/1995 | Cuddihy et al. |
| 5,508,941 A | | 4/1996 | Leplingard et al. |

(List continued on next page.)

OTHER PUBLICATIONS

Butler, K. L.; "An Expert System Based Framework For An Incipient Failure Detection and Predictive Maintenance System"; ISAP Jan. 28–Feb. 2, 1996; pp. 321–326; XP002159787.

Homce G. et al; "Reducing Unscheduled Plant Maintenance Delays Field Test Of A New Method To Predict Electric Motor Failure"; IEEE Transactions on Industry Applications; vol. 32, No. 3, May 1, 1996; pp. 689–694; XP000598121.

Data–Tronic Gas Turbine Information And Control System; General Electric Gas Turbine Reference Library; 8 pgs.

*Primary Examiner*—Robert Beausoliel
*Assistant Examiner*—Marc M Duncan
(74) *Attorney, Agent, or Firm*—Ann M. Agosti; Beusse, Brownlee, Bowdoin & Wolter, PA; Enrique J. Mora

(57) ABSTRACT

A method for analyzing fault log data and repair data to estimate time before a machine-disabling failure occurs is provided. The method allows for searching in a database of historical fault log data from a plurality of machines for the occurrence of respective fault patterns indicative of incipient failures of a respective machine subsystem. The method further allows for searching in a database of historical repair data for respective repairs executed on the respective machine subsystem. The method also allows for computing elapsed time between respective occurrences of the fault patterns and the executed repairs.

38 Claims, 9 Drawing Sheets

U.S. PATENT DOCUMENTS

| | | |
|---|---|---|
| 5,528,516 A | 6/1996 | Yemini et al. |
| 5,594,663 A | 1/1997 | Messaros et al. |
| 5,596,712 A * | 1/1997 | Tsuyama et al. .............. 714/26 |
| 5,633,628 A | 5/1997 | Denny et al. |
| 5,638,296 A | 6/1997 | Johnson et al. |
| 5,661,668 A | 8/1997 | Yemini et al. |
| 5,666,534 A | 9/1997 | Gilbert et al. |
| 5,678,002 A | 10/1997 | Fawcett et al. |
| 5,742,915 A | 4/1998 | Stafford |
| 5,933,821 A | 8/1999 | Matsumoto et al. |
| 5,950,147 A * | 9/1999 | Sarangapani et al. .......... 701/1 |
| 6,247,145 B1 * | 6/2001 | Witteried ..................... 714/33 |
| 6,418,361 B2 * | 7/2002 | Sinex ......................... 340/439 |

* cited by examiner

| CUST | UNIT | DATE | CODE | DESC | DESCI |
|---|---|---|---|---|---|
| RR | 3500 | Sun Jul 13 1997 | 1111 | Piping Fittings-Engine Intercooler | REPAIRED WATER LEAK AT TOP OF RT |
| RR | 3500 | Tue Jul 01 1997 | 2222 | Lube Oil-Engine | WATER IN LUBE OIL CHANGED OIL |
| RR | 3500 | Sat Jun 28 1997 | 3333 | BRP-Battery Charger Regulator Panel | NO BATTCHARGE-REPL BRP |
| RR | 3500 | Wed Jun 18 1997 | 4444 | EFI-High Pressure Pump | REPLACE 3 HP PUMPS FOR NOT FIRING |
| RR | 3500 | Mon Jun 09 1997 | 5555 | Turbocharger Assembly-Eng | TURBO DRAGSSECONDARY DAMAGE-RPL |
| RR | 3500 | Sat May 24 1997 | 6666 | Cylinder Assembly-General-Eng | REPL R6 PA FOR SECONDARY DAMAGE |
| RR | 3500 | Sat May 24 1997 | 7777 | Cylinder Assembly-General-Eng | TRIPPING COP PISTON FAILURE CO |

FIG. 2A

| FIG. 2A |
|---|
| FIG. 2B |

FIG. 2

| FAILMODE_DESC | SUB_ASSEMBLY_CODE | MAIN_ASSEMBLY_CODE |
|---|---|---|
| LEAKING FLUIDAIR | ENGINTCOOL | ENGINE |
| CONTAMINATED | LUBEOIL | ENGISUPT |
| UNKNOWNUNDETERMINED | POWERPANEL | POWERELN |
| UNKNOWNUNDETERMINED | ENGFUELINJ | ENGINE |
| UNKNOWNUNDETERMINED | ENGTURBO | ENGINE |
| UNKNOWNUNDETERMINED | POWERASSY | ENGINE |
| UNKNOWNUNDETERMINED | POWERASSY | ENGINE |

FIG. 2B

| | | | | | | | | | | | | | | |
|---|---|---|---|---|---|---|---|---|---|---|---|---|---|---|
| RR | 3500 | 03-may-1997 | 1000 | 90623.06 | 0.0 | C | S | 0 | 1 | 2 | 0 | 101 | 97 | R E O O | Intake Manifold Air Too |
| RR | 3500 | 03-may-1997 | 2000 | 90623.06 | 0.0 | C | S | 0 | 1 | 2 | 0 | 101 | 97 | R E O O | Intake Manifold Air Too |
| RR | 3500 | 22-may-1997 | 3000 | 91067.93 | 11.4 | M | E | F | 0 | 6 | 4706 | 202 | 177 | 182 | M E F 0 6 AB_M_S_ COP Trip |
| RR | 3500 | 22-may-1997 | 4000 | 91067.93 | 11.4 | F | 5 | 992 | 288 | 4706 | 202 | 177 | 182 | M E F 0 6 AB_M_S_ COP Trip |
| RR | 3500 | 22-may-1997 | 5000 | 91068.70 | 16.5 | F | 4 | 885 | 338 | 2864 | 133 | 175 | 186 | M E 2 4 6 AB_M_S_ COP Trip |
| RR | 3500 | 22-may-1997 | 6000 | 91068.70 | 16.5 | F | 4 | 885 | 338 | 2864 | 133 | 175 | 186 | M E 2 4 6 AB_M_S_ COP Trip |
| RR | 3500 | 22-may-1997 | 7000 | 91068.71 | 0.00 | 17.9 | F | 1 | 458 | 6 | 0 | 174 | 186 | R E F 4 E AB | Fault Reset While In Le |
| RR | 3500 | 22-may-1997 | 8000 | 91068.71 | 0.00 | 17.9 | F | 1 | 458 | 6 | 0 | 174 | 186 | R E F 4 E AB | Fault Reset While In Le |
| RR | 3500 | 22-may-1997 | 9000 | 91069.55 | 23.1 | F | 5 | 992 | 474 | 3005 | 148 | 180 | 187 | M E 2 0 R 6 AB_M_S_ COP Trip |
| RR | 3500 | 22-may-1997 | 1111 | 91069.55 | 23.1 | F | 5 | 992 | 474 | 3005 | 148 | 180 | 187 | M E 2 0 R 6 AB_M_S_ COP Trip |
| RR | 3500 | 22-may-1997 | 2222 | 91069.58 | 27.4 | F | 6 | 1010 | 506 | 2405 | 128 | 179 | 189 | M E F 4 6 AB_M_S_ COP Trip |

FIG. 3

METHOD AND SYSTEM FOR ESTIMATING TIME OF OCCURRENCE OF MACHINE-DISABLING FAILURES

This application claims the benefit of U.S. Provisional Application No. 60,162,047 filed Oct. 28, 1999.

BACKGROUND OF THE INVENTION.

The present invention relates generally to machine diagnostics, and more specifically, to a system and method for estimating time-to-road failure using fault pattern recognition and time-line analysis.

A machine, such as a locomotive or other complex systems used in industrial processes, medical imaging, telecommunications, aerospace applications, power generation, etc., includes elaborate controls and sensors that generate faults when anomalous operating conditions of the machine are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences—or cases) is applicable to problem solving as learning rules or behaviors. CBR relies on relatively little pre-processing of raw knowledge, focusing instead on indexing, retrieval, reuse, and archival of cases. In the diagnostic context, a case refers to a problem/ solution description pair that represents a diagnosis of a problem and an appropriate repair.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. patent application Ser. No. 09/285,611, (Attorney Docket No. RD-26,576), assigned to the same assignee of the present invention and herein incorporated by reference, discloses a system and method for processing historical repair data and fault log data, which is not restricted to sequential occurrences of fault log entries and which provides weighted repair and distinct fault cluster combinations to facilitate analysis of new fault log data from a malfunctioning machine. Further, U.S. patent application Ser. No. 09/285,612, (Attorney Docket No. 20-LC-1927), assigned to the same assignee of the present invention and herein incorporated by reference, discloses a system and method for analyzing new fault log data from a malfunctioning machine wherein the system and method are not restricted to sequential occurrences of fault log entries, and further wherein the system and method predict one or more repair actions using predetermined weighted repair and distinct fault cluster combinations.

It is believed that the inventions disclosed in the foregoing patent applications provide substantial advantages and advancements in the art of diagnostics. It would be desirable, however, to be able to provide accurate and reliable estimates of the time it takes for a road failure to actually occur from the time predetermined faults or fault patterns begin to occur in the locomotive. The foregoing ability would be particularly useful to determine not only whether an impending road failure is developing but would enable to quantify when that road failure is likely to occur. Road failures in locomotives and other machines give rise to costly inefficiencies since, in the case of a locomotive, they stop the locomotive from transporting freight and passengers and contribute to lost revenue, productivity and good will. Having the ability to reliably and accurately predict the cause and the timing of any road failure is desirable since it would enable to schedule corrective action at the most appropriate time. For example, instead of rushing the locomotive to the nearest service center, depending on the length of the predicted time before the road failure, the locomotive could still be operated for a certain period of time thereby preventing loss of revenue and productivity. Conversely, if the predicted time before the road failure is relatively short, then the locomotive repair may be prioritized over other locomotives that are not facing an imminent road failure.

BRIEF SUMMARY OF THE INVENTION

Generally speaking, the present invention fulfills the foregoing needs by providing a method for analyzing fault log data and repair data to estimate time before a machine-disabling failure occurs. The method allows for searching in a database of historical fault log data from a plurality of machines for the occurrence of respective fault patterns indicative of incipient failures of a respective machine subsystem. The method further allows for searching in a database of historical repair data for respective repairs executed on the respective machine subsystem. The method also allows for computing elapsed time between respective occurrences of the fault patterns and the executed repairs.

The present invention further fulfills the foregoing needs by providing a system for analyzing fault log data and repair data to estimate time before a machine-disabling failure occurs. The system includes a database of historical fault log data from a plurality of machines and a first search module configured to search in the database of historical fault log data for the occurrence of respective fault patterns indicative of incipient failures of a respective machine subsystem. The system further includes a database of historical repair data and a search module configured to search in the database of historical repair data for respective repairs executed on the respective machine subsystem. A computer module is configured to compute elapsed time between respective occurrences of the fault patterns and the executed repair.

BRIEF DESCRIPTION OF THE DRAWINGS

The features and advantages of the present invention will become apparent from the following detailed description of the invention when read with the accompanying drawings in which:

FIG. 2 is an illustration of exemplary repair data;

FIG. 3 is an illustration of exemplary fault log data;

DETAILED DESCRIPTION OF THE INVENTION

Figure 1:
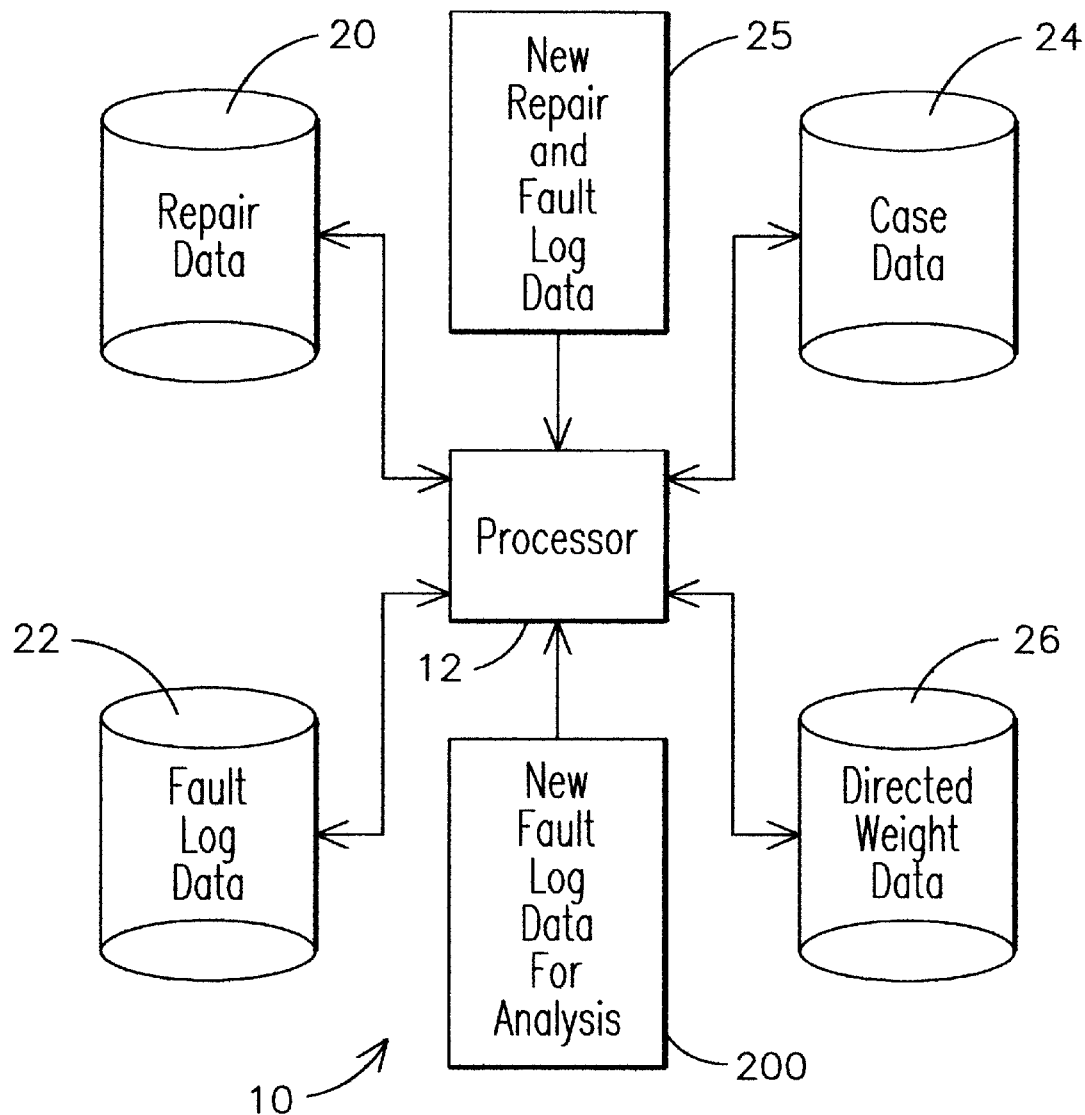
FIG. 1 is a block diagram of a system that may be used for implementing an embodiment of the present invention.

FIG. 1 diagrammatically illustrates one exemplary embodiment of a diagnostic system 10 that may be used in conjunction with the present invention. System 10 provides a process for automatically harvesting or mining repair data comprising a plurality of related and unrelated repairs and fault log data comprising a plurality of faults, from one or more machines such as locomotives, and generating weighted repair and distinct fault cluster combinations which are diagnostically significant predictors to facilitate analysis of new fault log data from a malfunctioning locomotive.

Although the present invention is described with reference to a locomotive, system 10 can be used in conjunction with any machine in which operation of the machine is monitored, such as a chemical, an electronic, a mechanical, or a microprocessor machine.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to and processes data contained in a repair data storage unit 20 and a fault log data storage unit 22.

Repair data storage unit 20 includes repair data or records regarding a plurality of related and unrelated repairs for one or more locomotives. FIG. 2 shows an exemplary portion 30 of the repair data contained in repair data storage unit 20. The repair data may include predetermined data fields, such as a customer identification number 32, a locomotive identification or unit number 33, the date 34 of the repair, the repair code 35, a repair code description 36, a description of the actual repair 37 performed, etc.

Fault log data storage unit 22 includes fault log data or records regarding a plurality of faults occurring prior to the repairs for one or more of the locomotives. FIG. 3 shows an exemplary portion 40 of the fault log data contained in fault log data storage unit 22. The fault log data may include predetermined data fields, such as a customer identification number 42, a locomotive identification number or unit 44, the date 45 when the fault occurred, a fault code 46, a fault code description 48, etc.

Figure 4:
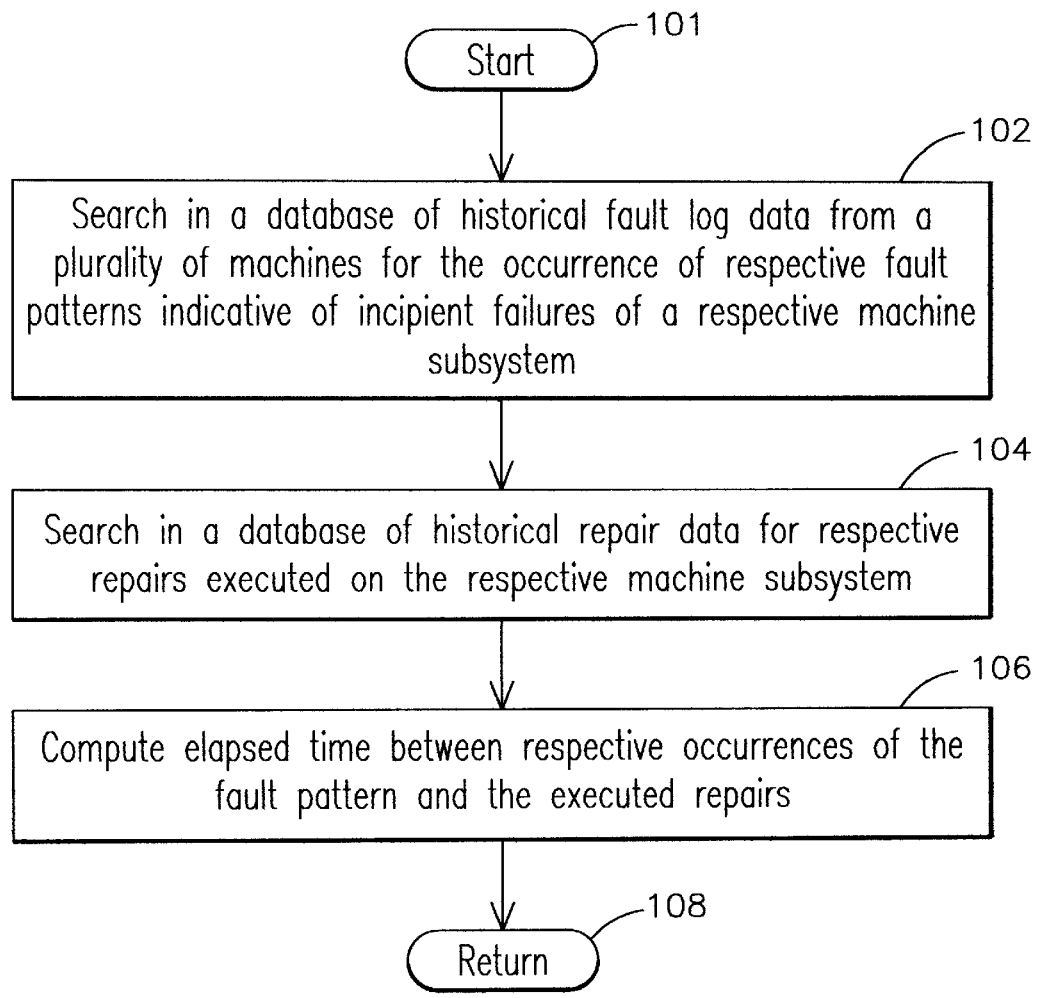
FIG. 4 is a flow chart of an exemplary, embodiment of the method of the present invention illustrating respective searching steps and a step for computing elapsed time.

FIG. 4 is a flow chart of an exemplary embodiment of the method of the present invention that allows for predictively estimating the time of occurrence of a machine-disabling failure (e.g., time-to-road failure) using fault log data and repair data. The method may involve the following steps: (1) identification of respective fault patterns indicative of a failed subsystem or an impending failure; (2) searching through respective historical databases of fault log data and repair data to identify the occurrence of the fault patterns; and (3) computing time-to-road failure information. The method also has the capability to compute various accuracy indicators, such as number of correct detection of failures, and number of false alarms, such as may occur when a fault pattern is detected and no failure occurs or an unrelated failure occurs. It is similarly useful to identify other conditions, such as may occur when no fault pattern is detected and a failure does occur.

As will be appreciated by those skilled in the art, identification of the fault pattern may be realized using well-understood failure detection analysis (FDA) techniques employing failure mode and effects analysis (FMEA) or any other suitable failure detection techniques. The FDA allows for identifying the respective failure modes of a given subsystem of the locomotive, and their symptoms, that is, the fault patterns that are observed when the specific failure mode occurs. For further background information regarding an automated system for detecting fault patterns, the reader is referred to the above referred U.S. patent application Ser. No. 09/285,611, (Attorney Docket No. RD-26576), and U.S. patent application Ser. No. 09/285,612, (Attorney Docket No. 20-LC-1927). For background information regarding a system and method for predicting impending failures in a machine having a plurality of subsystems based on detection of trend patterns in the fault log data, the reader is referred to U.S. patent application Ser. No. 09/389,739, (Attorney Docket No. 20-LC-1939), which is assigned in common to the same assignee of the present invention and is herein incorporated by reference. It will be appreciated that regardless of the specific implementation of the FDA, the objective of this analysis is to identify a plurality of respective faults or fault patterns, or fault trends that may be indicative of an impending or incipient failure which if left uncorrected could develop into a machine-disabling failure, e.g., a road failure in the context of a locomotive.

As shown in FIG. 4, subsequent to start of operations at step 101, step 102 allows for searching in a database of historical fault log data (e.g., database 22 in FIG. 1) from a plurality of machines for the occurrences of respective fault patterns indicative of incipient failures of a respective machine subsystem. It will be appreciated that the level of fault identification may be refined to any desired level based on the specific application. For example, respective faults or fault patterns may be associated with respective subsystem assemblies, and the fault patterns may be further categorized to identify individual components of the respective subsystem assemblies. Step 104 allows for searching in a database of repair data (e.g., database 20 in FIG. 1) for respective repairs executed on the respective machine subsystem. Prior to return step 108, step 106 allows for computing elapsed time between respective occurrences of the fault pattern and the executed repairs. As suggested above, the elapsed time may be obtained by computing the time difference in data field 34 in the exemplary repair data of FIG. 2 relative to data field 45 in the exemplary fault log data of FIG. 3. As suggested above, the relationship between a respective fault pattern and a respective repair or failure may be initially developed through a manual analysis process where teams of one or more human experts validate each case and new cases similar to the ones validated by, the teams of human expert may be used to populate a database of cases, (e.g., database 24 in FIG. 1). It will be appreciated that when initially setting up case data storage unit 24, (FIG. 1) a field engineer may review each of the plurality of cases to determine whether the identified data, i.e., fault log patterns, provide a good indication of the repair. If not, one or more cases can be excluded or removed from case data storage unit 24. This review by a field engineer would increase the initial accuracy of the system in assigning weights to the repair, and fault cluster combinations. The assigned weights may be stored in a directed weight database 26 (FIG. 1).

Figure 5:
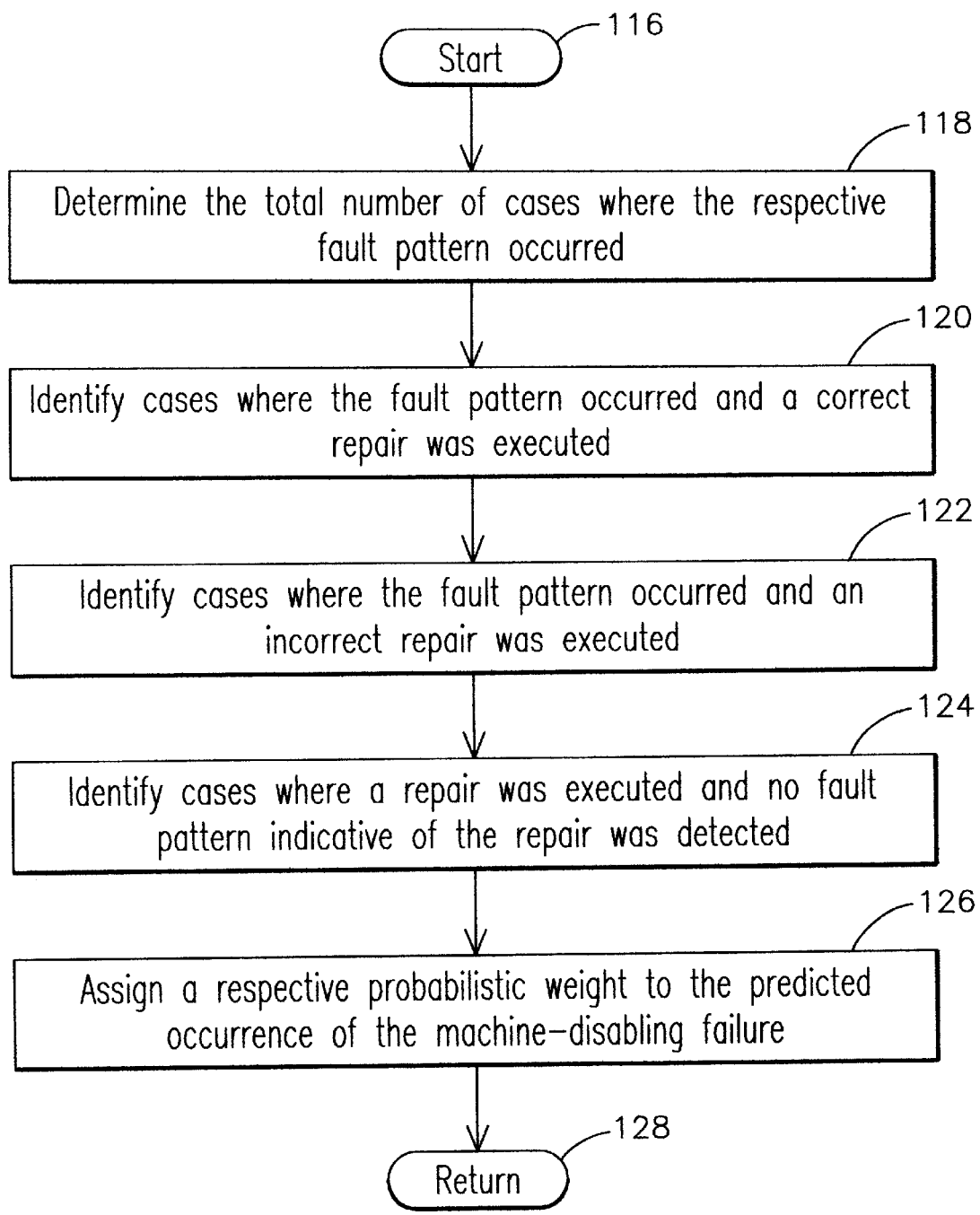
FIG. 5 is a flow chart illustrating further details regarding the searching steps of FIG. 4.
Figure 6:
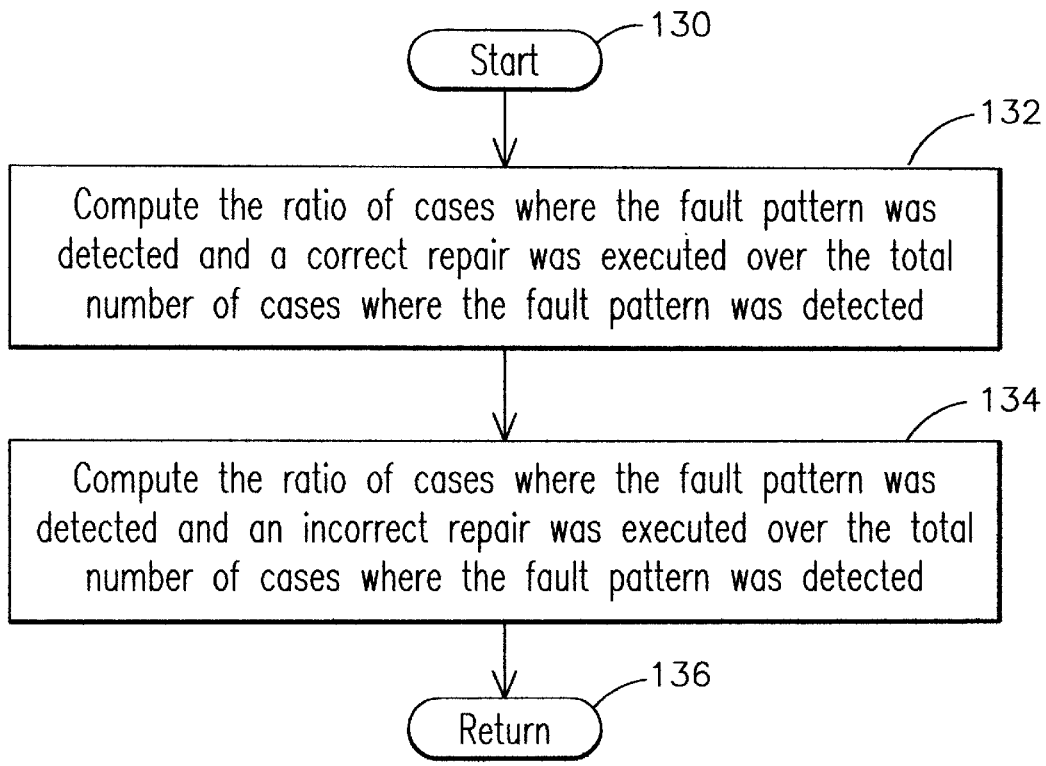
FIG. 6 is a flow chart illustrating exemplary steps for computing predictive accuracy of the method of the present invention.

FIG. 5 is a flow chart illustrating further details of the present invention regarding the predictive accuracy of the identified fault patterns. As shown in FIG. 5, subsequent to start step 116, step 118 allows for determining the total number of cases where a respective fault pattern occurred. Step 120 allows for identifying cases where the fault pattern occurred and a correct repair was executed. Conversely, step 122 allows for identifying cases where the fault pattern occurred and an incorrect repair was executed. Similarly, step 124 allows for identifying cases where a repair was executed and no fault pattern indicative of the repair was detected. Prior to return step 128, step 126 allows for assigning a respective probabilistic weighing value to the predicted occurrence of the road failure. At this stage one is verifying that in fact the identified fault pattern is truly indicative of a respective incipient failure. If the weight value is below a predetermined threshold value, then further analysis may be required to fine tune the identified fault pattern. For example, the fault pattern may require addition or deletion of specific faults or combinations thereof. It will thus be appreciated that the searching process may be conducted in two distinct stages: (1) look for all failures/repairs related to subsystems of interest, and (2) look for all occurrences of the identified fault patterns. As suggested above, using these two search stages, the following exemplary parameters may be calculated: (1) number of cases where a fault pattern was observed and a correct failure occurred, (2) number of cases where a fault pattern was observed and an incorrect failure occurred, and (3) number of cases where the failure of interest occurred, but the fault pattern was not observed. For example, as shown in FIG. 6, subsequent to start step 130, step 132 allows to compute the ratio of cases where the fault pattern was detected and a correct repair was executed over the total number of cases where the fault pattern was detected. It will be appreciated that the foregoing ratio allows to statistically quantify the accuracy of the identified fault pattern for detecting an incipient failure. Also as shown in FIG. 6, prior to return step 136, step 134 allows to compute the ratio of cases where the fault pattern was detected and an incorrect repair was executed over the total number of cases where the fault pattern was detected. In this case, it will be appreciated that the ratio computed in step 134 is indicative of the respective false alarm rate of the identified pattern.

As suggested above, estimates of the time-to-road failure information may be computed using those cases where the fault pattern was observed and a correct failure occurred subsequently. For each of these cases, the time difference between the date field indicative of the date when the fault pattern occurred (data field 45 in FIG. 3) and the date the failure/repair occurred (data field 34 in FIG. 2) is computed and stored in a time difference field. See Table 1 below that shows exemplary data for three different locomotives respectively identified as locomotives UP 211, CSX 33, and CSX 130. As suggested above, the respective database of cases relates a specific set of faults (in column Fault Code and Sub ID) with a specific fix or repair (given in MDSC Code and Dasher description columns). Using this database, a search is conducted to look for the respective fault patterns previously identified in the FDA. For the sake of simplicity of explanation, in Table 1, the exemplary fault pattern searched for may be comprised of single faults, such as faults 7391, 7393, and 7325 with sub-identification numbers such as one and two. It will be appreciated, however, that the fault pattern may comprise distinct cluster of faults and/or pattern trends. For example, these faults may be indicative of incipient failures of a respective gate driver or phase module components in the traction subsystem of the locomotive.

TABLE 1

Example of data for identifying a fault pattern, and computing time-to-road failure.

| CUSTOMER | UNIT NO | MDSC CODE | DASHER DATE | DASHER DESCRIPTION | FAULT CODE | SUB ID | FAULT DATE | Time Difference | Correct ? |
|---|---|---|---|---|---|---|---|---|---|
| UP | 211 | 1403 | 06/12/96 | EBP - Equ | 7391 | 1 | 10-Apr-96 | 63 | 0 |
| UP | 211 | 1403 | 06/12/96 | EBP - Equ | 7391 | 2 | 10-Apr-96 | 63 | 0 |
| UP | 211 | 1403 | 06/12/96 | EBP - Equ | 7391 | 2 | 10-Apr-96 | 63 | 0 |
| UP | 211 | 1403 | 06/12/96 | EBP - Equ | 7391 | 2 | 10-Apr-96 | 63 | 0 |
| CSX | 33 | 1676 | 05/01/99 | SS1 - Tra | 7393 | 1 | 12-Mar-99 | 50 | 0 |
| CSX | 33 | 1676 | 05/01/99 | SS1 - Tra | 7393 | 1 | 12-Mar-99 | 50 | 0 |
| CSX | 33 | 1676 | 05/01/99 | SS1 - Tra | 7325 | 1 | 16-Mar-99 | 46 | 0 |
| CSX | 33 | 1676 | 05/01/99 | SS1 - Tra | 7325 | 1 | 16-Mar-99 | 46 | 0 |
| CSX | 33 | 1676 | 05/01/99 | SS1 - Tra | 7325 | 1 | 16-Mar-99 | 46 | 0 |
| CSX | 33 | 1676 | 05/01/99 | SS1 - Tra | 7325 | 1 | 16-Mar-99 | 46 | 0 |
| CSX | 33 | 1676 | 05/01/99 | SS1 - Tra | 7325 | 1 | 16-Mar-99 | 46 | 0 |
| CSX | 33 | 1676 | 05/01/99 | SS1 - Tra | 7325 | 1 | 16-Mar-99 | 46 | 0 |
| CSX | 33 | 1676 | 05/01/99 | SS1 - Tra | 7325 | 1 | 17-Mar-99 | 45 | 0 |
| CSX | 33 | 1676 | 05/01/99 | SS1 - Tra | 7325 | 1 | 17-Mar-99 | 45 | 0 |
| CSX | 33 | 1676 | 05/01/99 | SS1 - Tra | 7325 | 1 | 17-Mar-99 | 45 | 0 |
| CSX | 33 | 1676 | 05/01/99 | SS1 - Tra | 7325 | 1 | 17-Mar-99 | 45 | 0 |
| CSX | 130 | 1676 | 05/08/99 | SS1 - Tra | 7425 | 4 | 01-Apr-99 | 37 | 0 |

TABLE 1-continued

Example of data for identifying a fault pattern, and computing time-to-road failure.

| CUSTOMER | UNIT NO | MDSC CODE | DASHER DATE | DASHER DESCRIPTION | FAULT CODE | SUB ID | FAULT DATE | Time Difference | Correct? |
|---|---|---|---|---|---|---|---|---|---|
| CSX | 130 | 1676 | 05/08/99 | SS1 - Tra | 7425 | 1 | 01-Apr-99 | 37 | 0 |

Figure 7A:
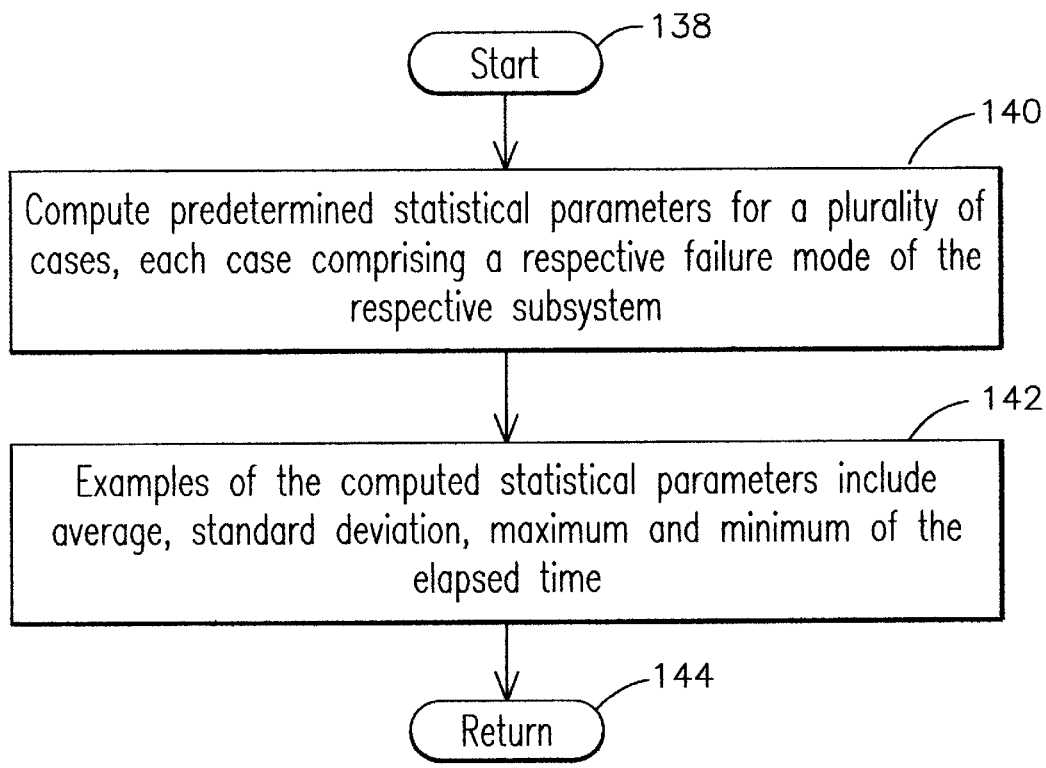
FIGS. 7A and 7B illustrate respective flow charts for computing predetermined statistical parameters for the computed elapsed time of FIG. 4.
Figure 7B:
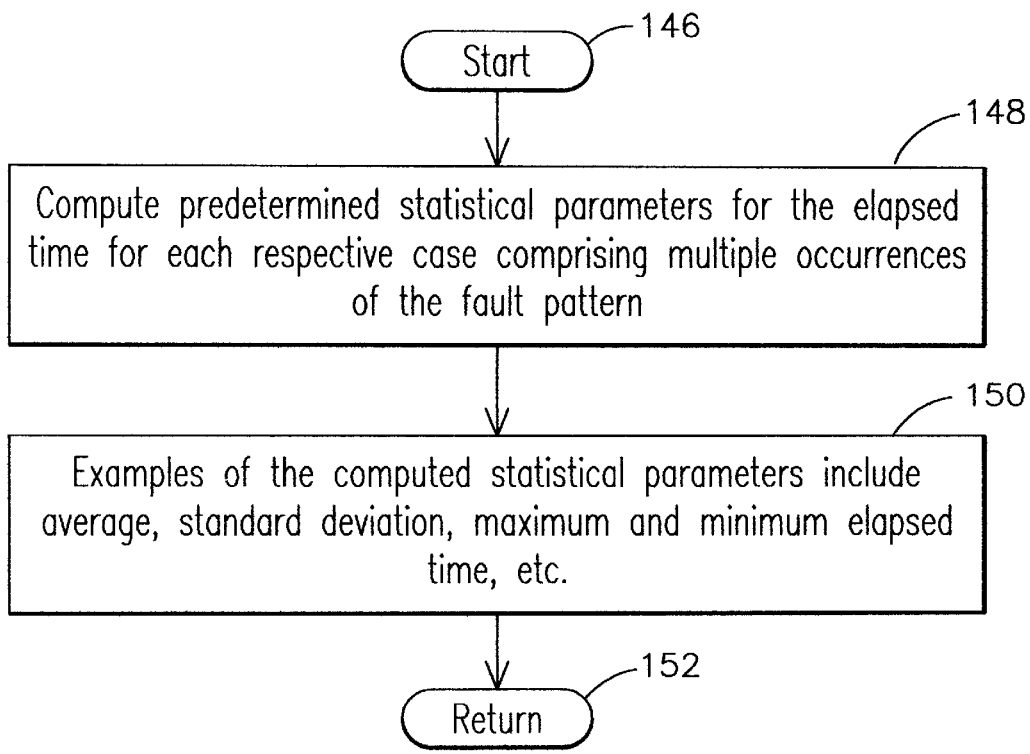

Using this time difference information, predetermined statistical parameters, such as the mean, standard deviation, minimum, or maximum time difference within each case is calculated. As shown in FIG. 7A, if a fault pattern occurs multiple number of times within a single case, then subsequent to start step 138, step 140 allows for computing the foregoing statistical parameters, which are further conveniently listed in block 142, prior to return step 144. As shown in FIG. 7B, subsequently to art step 146, step 148 allows to compute the statistical parameters shown in block 150, prior to return step for a plurality of cases so that each of them may be used for computing the predetermined-statistical parameters representative of all cases in order to provide time-to-road failure statistics as may be tabulated in table 2 below.

TABLE 2

Example of time-to-road failure statistics.

| | Time Difference (Days) Between Fault and Fix/Fault Within Each Case | | | |
|---|---|---|---|---|
| TIME TO REPAIR | Average | Min | Max | First Fault and Last |
| Average for All Cases | 17.2088 | 8.8879 | 28.526 | |
| Std for All Cases | 19.4276 | 15.651 | 30.557 | |
| Min for All Cases | 0 | 0 | 0 | |
| Max for All Cases | 86.5 | 84 | 90 | |

Figure 9:
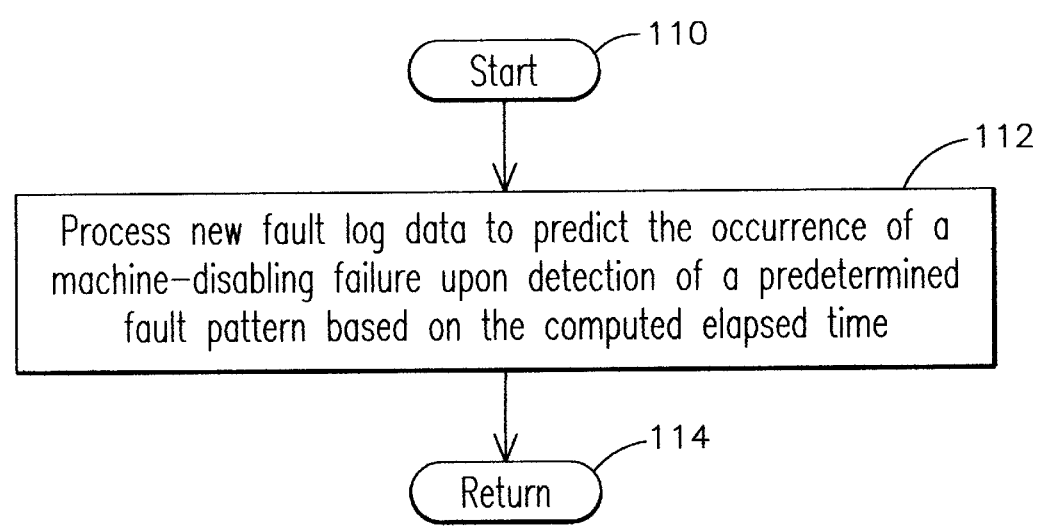
FIG. 9 is a flow chart that uses the computed elapsed time to process new fault log data so as to predict time of occurrence of a machine-disabling failure, e.g., a road failure.
Figure 8:
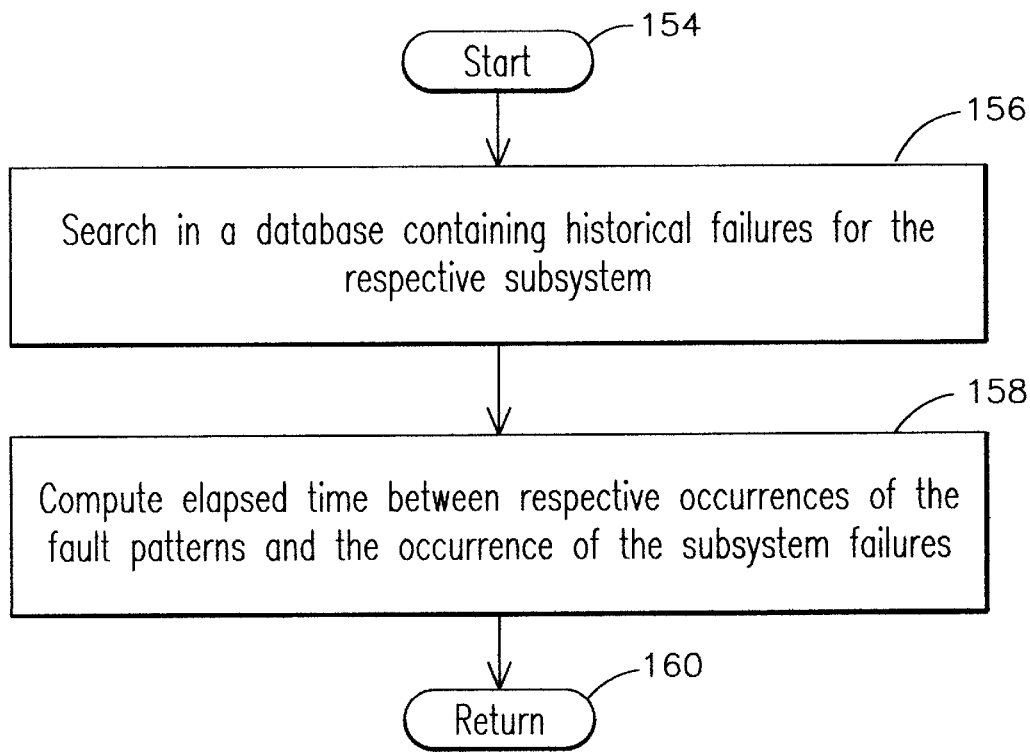
FIG. 8 is a flow chart of another exemplary embodiment for computing elapsed time.

In cases where the respective databases do not contain a statistically significant number of cases, (e.g., about 10 or more cases) an optional back-up manual analysis process could be conducted where an externally-derived database containing historical failures for the respective subsystem may be used in lieu of repair database 20 (FIG. 1). Thus, as shown in FIG. 8, subsequent to start step 154, step 156 allows for searching in a database containing historical failures for the respective subsystem. Prior to return step 160, step 158 allows for computing elapsed time between the respective occurrences of the fault patterns and the occurrence of the subsystem failures. As shown in FIG. 9, and subsequent to start step 110, step 112 allows to process new fault log data to predict the occurrence of a machine disabling failure upon detection of a predetermined fault pattern based on the computed elapsed time, i.e., time-to-road failure. In operation, once the time-to-road failure statistics for a predetermined fault pattern have been determined, then whenever that fault pattern appears in new fault log data, such as may be downloaded from one or more locomotives to a diagnostic service center. Then, the service center may now accurately determine a repair schedule that does take into account whether a given incipient failure requires immediate corrective action, or whether the corrective action for that incipient failure can wait until the locomotive finishes an ongoing mission. Once again, the time-to-road failure information conveniently enables to prevent undesirable and costly road failures where a locomotive could be stranded in a rail track possibly causing traffic gridlock in addition to being unable to haul the cargo to its intended destination.

Figure 10:
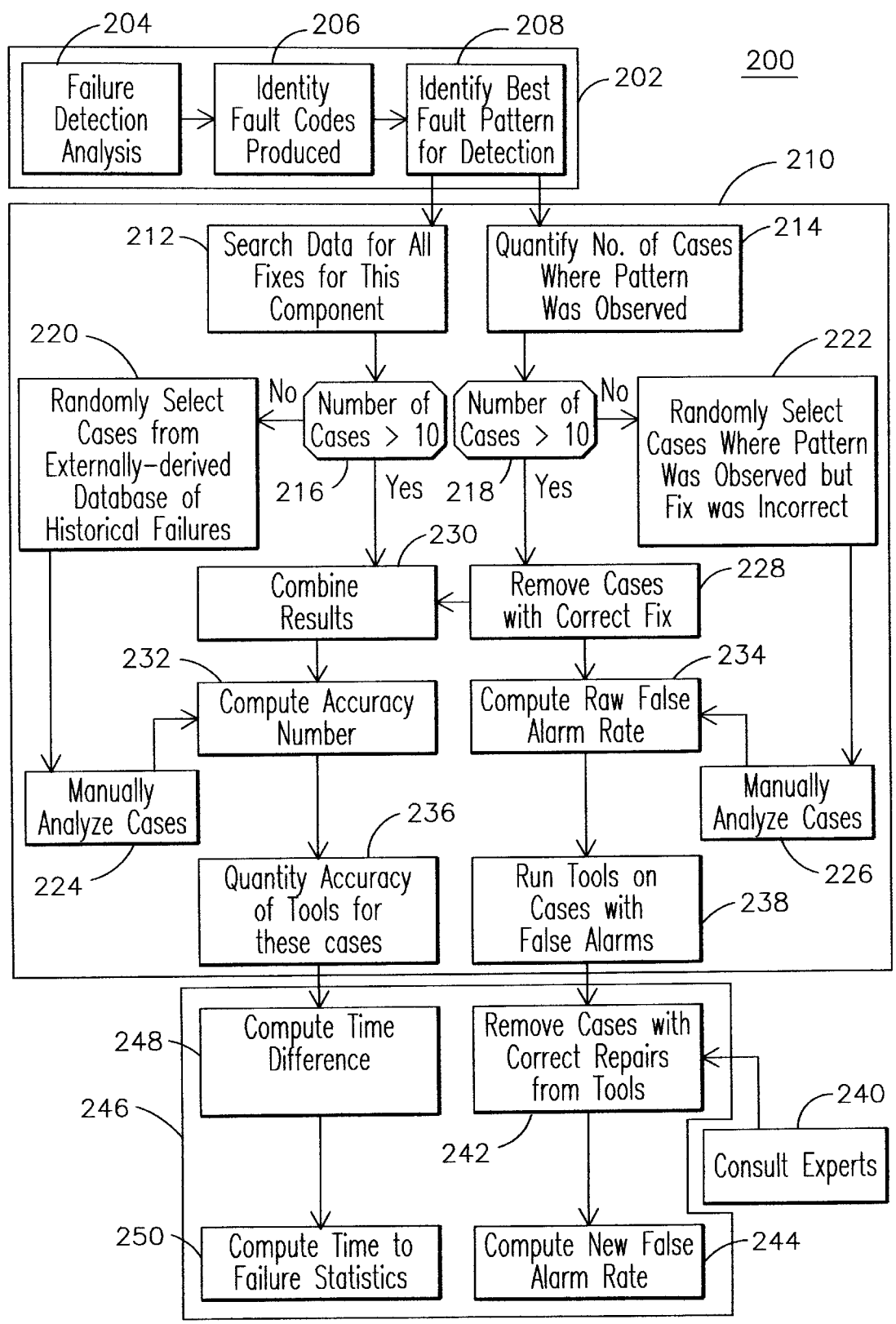
FIG. 10 is an exemplary modular schematic of an embodiment that allows for implementing the overall process of the present invention.

FIG. 10 shows an exemplary schematic of the overall techniques of the present invention. As suggested above, and as shown in FIG. 10, a system 200 for implementing the present invention may comprise a module 202 for identifying predetermined fault patterns indicative of incipient machine failures. Module 202 may use a failure detection analysis module 204 coupled to a fault identification module 206 to collect or identify the various fault codes that may be produced by the respective subsystems of the machines.

The fault codes identified in module 206 are in turn used by a fault pattern identification module 208 to identify respective fault patterns indicative of incipient failures of the machines. As described above, a searching module 210 in turn uses respective searching sub-modules 212 and 214 for searching respective fault log data and repair that would allow for matching a respective fault pattern to a respective repair or incipient failure. For example, sub-module 212 allows for searching repair data for all repairs or fixes that may have been executed for a given subsystem or subsystem component. The sub-module 214 allows for quantifying the number of cases where a respective fault pattern indicative of a respective incipient failure was observed by searching and identifying all such cases.

Respective modules 216 and 218 allow for determining whether the number of cases obtained from the searching sub-modules 212 and 214 is sufficiently large so as to comprise a statistically meaningful sample (e.g., about 10 or more cases). The respective optional modules 220 and 222 allow for continuation of the process even though the number of cases may not be sufficiently large so as to comprise a statistically meaningful sample. For example, module 222 allows for randomly selecting all cases (e.g., 10 or less cases) where a predetermined fault pattern was observed but a repair was incorrect. Module 220 allows for randomly selecting cases (e.g., 10 or less cases) from an externally-derived database of historical failures, referred herein as Dasher database. In either case, respective modules 224 and 226 allow for manually analyzing the respective cases obtained from the random selection results from respective modules 220 and 222.

If the number of cases is sufficiently large, e.g., larger than 10, then a module 228 allows for transferring cases that have a correct fix to a combining module 230 so as to combine cases where a correct fix was implemented with cases where the predictive fault pattern actually occurred. It would be apparent that a weightcomputing module 232 allows for computing the predictive accuracy of the fault pattern by computing the ratio of the number of cases where a fault pattern accurately predicted an incipient failure over the total number of cases where the fault pattern was detected. Conversely, module 234 allows for computing a false alarm rate by computing the ratio of the number of cases where a fault pattern inaccurately predicted an incipient failure over the total number of cases where the fault pattern was detected. If desired, a module 236 may be used for independently verifying the computed weight indicative of accuracy, such as may be obtained by an automated diagnostic tool, such as the diagnostic tool described in the above referred U.S. patent application Ser. No. 09/285,611, (Attorney Docket No. RD-26576), and U.S. patent application Ser. No. 09/285,612, (Attorney Docket No. 20-LC-1927).

Similarly, a module 238 may be optionally used for independently Verifying the computed false alarm rate from module 234 by running the diagnostic tools on cases with false alarms. An expert module 240 may allow for consulting with a team of experts so as to perform additional analysis on the cases with false alarms. It will be appreciated that expert module 240 allows for enhancing the identification of incipient failures by selective fine tuning of the fault patterns. Upon satisfactory resolution of cases containing false alarms, a module 242 allows for removing such resolved cases from the set of cases previously identified as containing a false alarm. A module 244 allows for recomputing the false alarm rate based on the case resolutions achieved through the expert analysis module 240.

A time-to-failure computing module 246 uses a time-difference computing module 248 for computing the time difference between the respective occurrences of the fault pattern and the occurrence of the failure/repair. As suggested above, module 250 allows to compute the various statistical parameters for the time-to-failure, as described above in the context of FIGS. 7A and 7B.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for analyzing fault log data and repair data to estimate time before a machine-disabling failure occurs, the method comprising:

searching in a database of historical fault log data from a plurality of machines for the occurrence of respective fault patterns indicative of incipient failures of a respective machine subsystem;

searching in a database of historical repair data for respective repairs executed on the respective machine subsystem; and computing elapsed time between respective occurrences of the fault patterns and the executed repairs.

2. The method of claim 1 wherein the step of searching in the database of historical fault log data comprises determining the total number of cases where the respective fault pattern occurred.

3. The method of claim 1 further comprising a step of identifying cases where the respective fault pattern occurred and a correct repair was executed.

4. The method of claim 1 further comprising a step of identifying cases where the respective fault pattern occurred and an incorrect repair was executed.

5. The method of claim 4 further comprising a step of identifying cases where a repair was executed and no fault pattern indicative of that repair was detected.

6. The method of claim 1 further comprising a step of searching in a database containing historical failures for the respective subsystem.

7. The method of claim 6 further comprising a step of computing elapsed time between respective occurrences of the fault patterns and the occurrence of the subsystem failures.

8. The method of claim 7 further comprising a step of identifying cases where a subsystem failure occurred and no fault pattern indicative of that subsystem failure was detected.

9. The method of claim 3 further comprising a step of computing the ratio of cases where the fault pattern occurred and a correct repair was executed over the total number of cases where the fault pattern was detected.

10. The method of claim 3 further comprising a step of computing the ratio of cases where the fault pattern occurred and an incorrect repair was executed over the total number of cases where the fault pattern was executed.

11. The method of claim 1 where the computing step comprises computing predetermined statistical parameters for the elapsed time for each respective case comprising multiple occurrences of the fault pattern.

12. The method of claim 11 wherein the predetermined statistical parameters computed for the elapsed time are selected from the group consisting of an average, a standard deviation, and maximum and minimum statistical parameters.

13. The method of claim 1 where the computing step comprises computing predetermined statistical parameters for the elapsed time for a plurality of cases, each case comprising a respective failure mode of the respective subsystem.

14. The method of claim 13 wherein the predetermined statistical parameters that are computed for the elapsed time are selected from the group consisting of an average, a standard deviation, and maximum and minimum statistical parameters.

15. The process of claim 1 further comprising a step of processing new fault log data so as to predict the occurrence of a machine-disabling failure upon detection of a predetermined fault pattern based on the computed elapsed time.

16. The process of claim 15 further comprising a step of assigning a respective probabilistic weight to the predicted occurrence of the machine disabling failure.

17. The method of claim 1 wherein the machine comprises a locomotive and the machine-disabling failure comprises a road failure.

18. The method of claim 1 further comprising a step of executing expert and/or automated analysis so as to improve the accuracy of the computed elapsed time.

19. A system for analyzing fault log data and repair data to estimate time before a machine-disabling failure occurs, the system comprising:

a database of historical fault log data from a plurality of machines;

a search module configured to search in the database of historical fault log data for the occurrence of respective fault patterns indicative of incipient failures of a respective machine subsystem;

a database of historical repair data;

a search module configured to search in the database of historical repair data for respective repairs executed on the respective machine subsystem; and a computer module configured to compute elapsed time between respective occurrences of the fault patterns and the executed repairs.

20. The system of claim 19 further comprising means for determining the total number of cases where the respective fault pattern occurred.

21. The system of claim 19 further comprising means for identifying cases where the respective fault pattern occurred and a correct repair was executed.

22. The system of claim 19 further comprising means for identifying cases where the respective fault pattern occurred and an incorrect repair was executed.

23. The system of claim 22 further comprising means for identifying cases where a repair was executed and no fault pattern indicative of that repair was detected.

24. The system of claim 19 further comprising a database containing historical failures of the respective subsystem.

25. The system of claim 24 further comprising means for searching in the database containing historical failures of the respective subsystem.

26. The system of claim 24 further comprising means for computing elapsed time between respective occurrences of the fault patterns and the occurrence of the subsystem failures.

27. The system of claim 26 further comprising means for identifying cases where a subsystem failure occurred and no fault pattern indicative of that subsystem failure was detected.

28. The system of claim 21 further comprising means for computing the ratio of cases where the fault pattern occurred and a correct repair was executed over the total number of cases where the fault pattern was detected.

29. The system of claim 21 further comprising means for computing the ratio of cases where the fault pattern occurred and an incorrect repair was executed over the total number of cases where the fault pattern was executed.

30. The system of claim 19 where the computer module comprises means for computing predetermined statistical parameters for the elapsed time for each respective case comprising multiple occurrences of the fault pattern.

31. The system of claim 30 wherein the predetermined statistical parameters computed for the elapsed time are selected from the group consisting of an average, a standard deviation, and maximum and minimum statistical parameters.

32. The system of claim 19 where the computer module comprises means for computing predetermined statistical parameters for the elapsed time for a plurality of cases, each case comprising a respective failure mode of the respective subsystem.

33. The system of claim 32 wherein the predetermined statistical parameters that are computed for the elapsed time are selected from the group consisting of an average, a standard deviation, and maximum and minimum statistical parameters.

34. The system of claim 19 further comprising means for processing new fault log data so as to predict the occurrence of a machine-disabling failure upon detection of a predetermined fault pattern based on the computed elapsed time.

35. The system of claim 34 further comprising means for assigning a respective probabilistic weight to the predicted occurrence of the machine disabling failure.

36. The system of claim 19 wherein the machine comprises a locomotive and the machine-disabling failure comprises a road failure.

37. The system of claim 19 further comprising means for executing expert and/or automated analysis so as to improve the accuracy of the computed elapsed time.

38. An article of manufacture comprising:

a computer program product comprising a computer-usable medium having a computer-readable code therein for executing the analysis of fault log data and repair data to estimate time before a machine-disabling failure occurs, the computer-readable code in the article of manufacture comprising:

a computer-readable program code module for searching in a database of historical fault log data from a plurality of machines for the occurrence of respective fault patterns indicative of incipient failures of a respective machine subsystem;

a computer-readable program code module for searching in a database of historical repair data for respective repairs executed on the respective machine subsystem;

a computer-readable program code module for computing elapsed time between respective occurrences of the fault patterns and the executed repairs; and a computer-readable program code module for processing new fault log data to predict the occurrence of a machine-disabling failure upon detection of a predetermined fault pattern based on the computed elapsed time.

* * * * *